(12) United States Patent
Lerner et al.

(10) Patent No.: US 8,460,813 B2
(45) Date of Patent: Jun. 11, 2013

(54) BATTERY PACK WITH AXIALLY EXTENDING AND ROTATABLE ELECTRICAL CONNECTIONS AND CATCH

(75) Inventors: Harry B Lerner, Woodbury, NY (US); Jason Chin Yen, Singapore (SG)

(73) Assignee: JANAM Technologies, LLC

( * ) Notice: Subject to any disclaimer, the term of this patent is extended or adjusted under 35 U.S.C. 154(b) by 536 days.

(21) Appl. No.: 12/653,970

(22) Filed: Dec. 21, 2009

(65) Prior Publication Data

US 2010/0209752 A1  Aug. 19, 2010

Related U.S. Application Data

(60) Provisional application No. 61/203,539, filed on Dec. 22, 2008.

(51) Int. Cl.
| | |
|---|---|
| H01M 2/10 | (2006.01) |
| H01M 10/38 | (2006.01) |
| H01M 6/42 | (2006.01) |
| H01M 2/24 | (2006.01) |
| H01M 2/00 | (2006.01) |

(52) U.S. Cl.
USPC ............. 429/97; 429/123; 429/149; 429/151; 429/158; 429/163

(58) Field of Classification Search
USPC ................ 429/123, 1, 97, 149, 151, 158, 163
See application file for complete search history.

(56) References Cited

U.S. PATENT DOCUMENTS

| | | | |
|---|---|---|---|
| 5,368,954 A | * | 11/1994 | Bruns .............................. 429/97 |
| 5,684,287 A | | 11/1997 | Walts |
| 5,949,408 A | | 9/1999 | Kang et al. |
| 6,421,233 B1 | | 7/2002 | Hong |
| 7,626,357 B2 | | 12/2009 | Hoffman et al. |

\* cited by examiner

*Primary Examiner* — Patrick Ryan
*Assistant Examiner* — Julian Anthony
(74) *Attorney, Agent, or Firm* — Thomas A. O'Rourke; Bodner & O'Rourke, LLP

(57) ABSTRACT

A battery pack may supply power to a device such as a PDA, a hand-held scanner, or a laptop computer, when inserted and rotatably locked therein. The battery pack is adapted to maintain electrical connectivity with the device, once unlocked, during counter-rotation and before removal. Electrical connectivity is provided by discrete electrical contact pads on the battery pack, each of which may form various annular shapes at different radii. The electrical contact pads are detected by spring-loaded pogo pins on the device. Electrical connectivity is maintained for a battery detect pin for only approximately fifteen degrees of counter-rotation, where its disengagement warns of impending power loss, and triggers a proper shut-down sequence to save data. One contact pad is electrically coupled to a negative terminal within the battery pack, and another is electrically coupled to a positive terminal. The battery pack houses one or more rechargeable batteries, preferably lithium-ion.

42 Claims, 22 Drawing Sheets

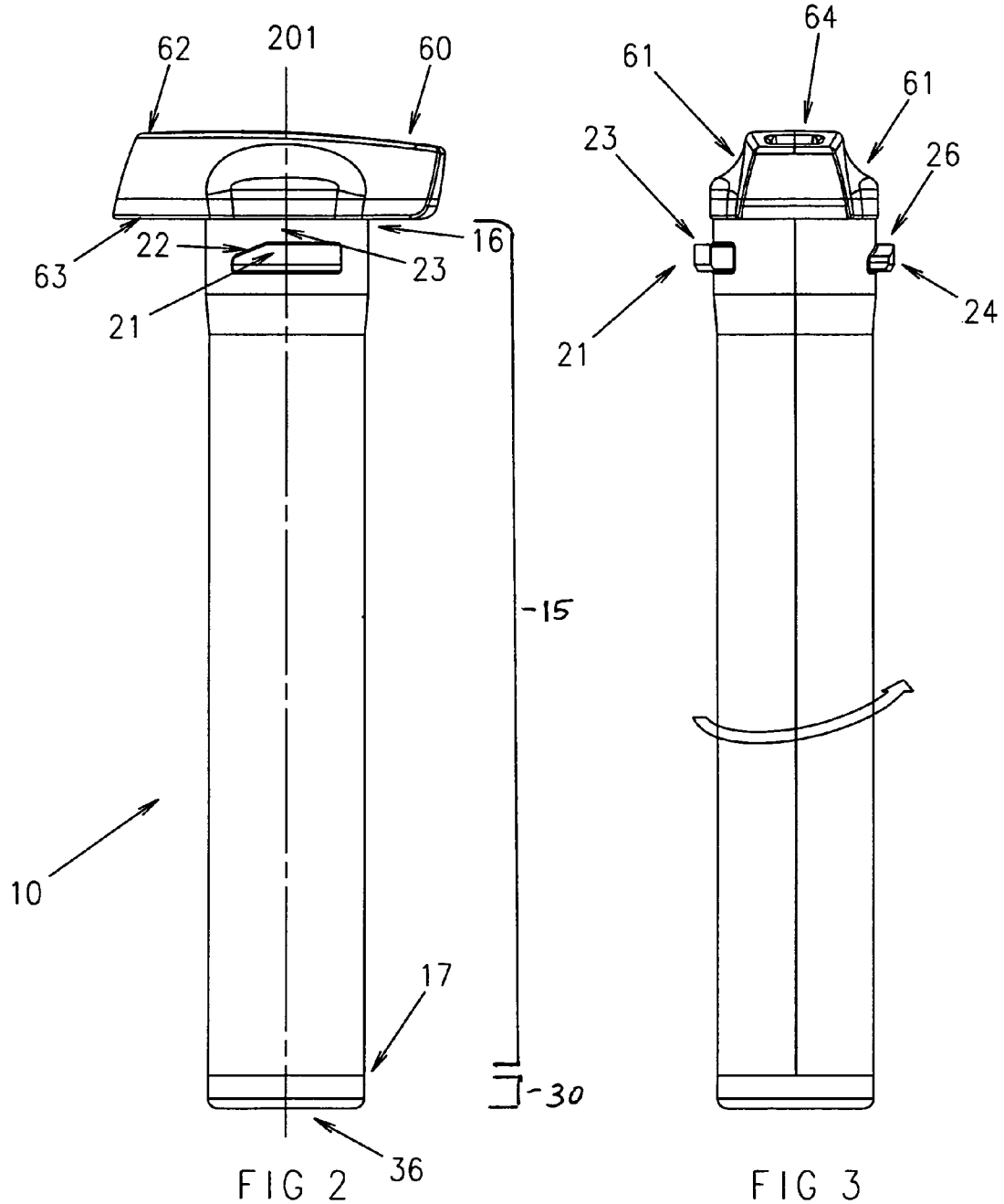

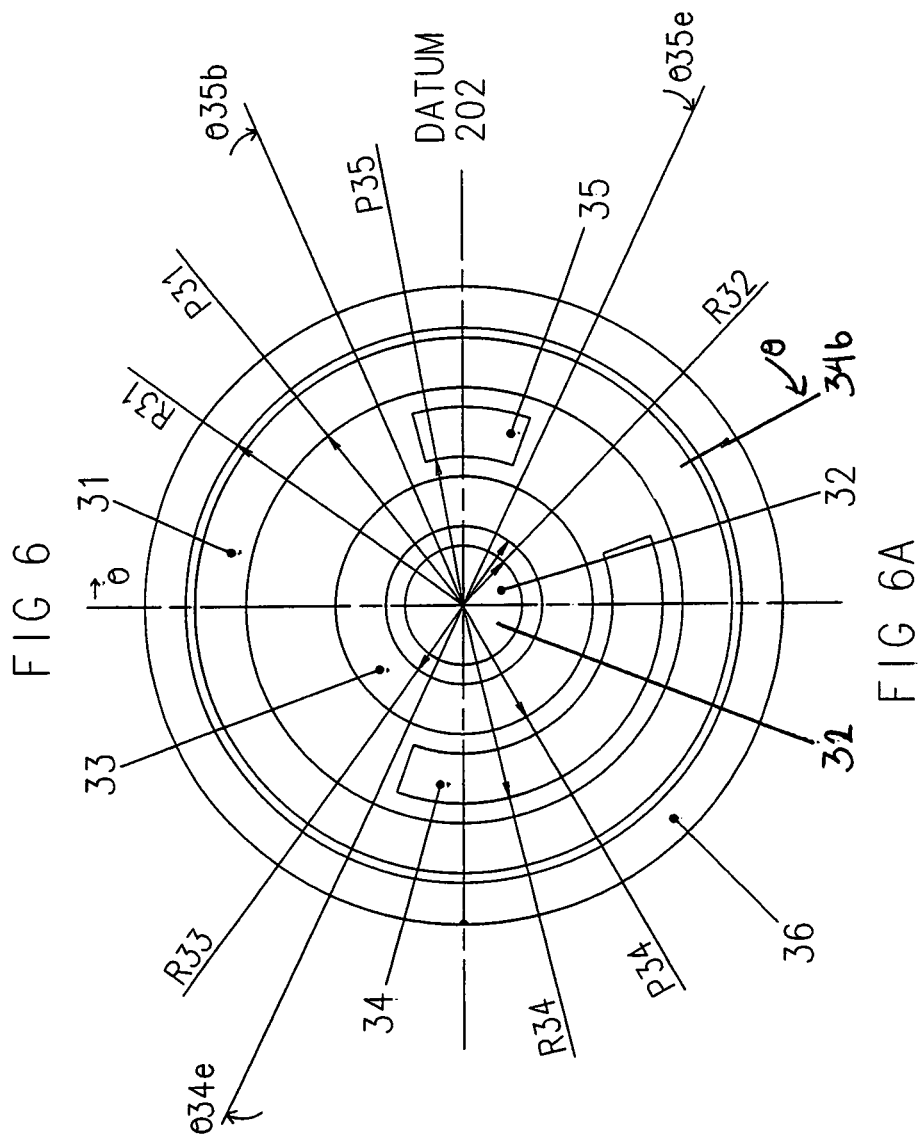

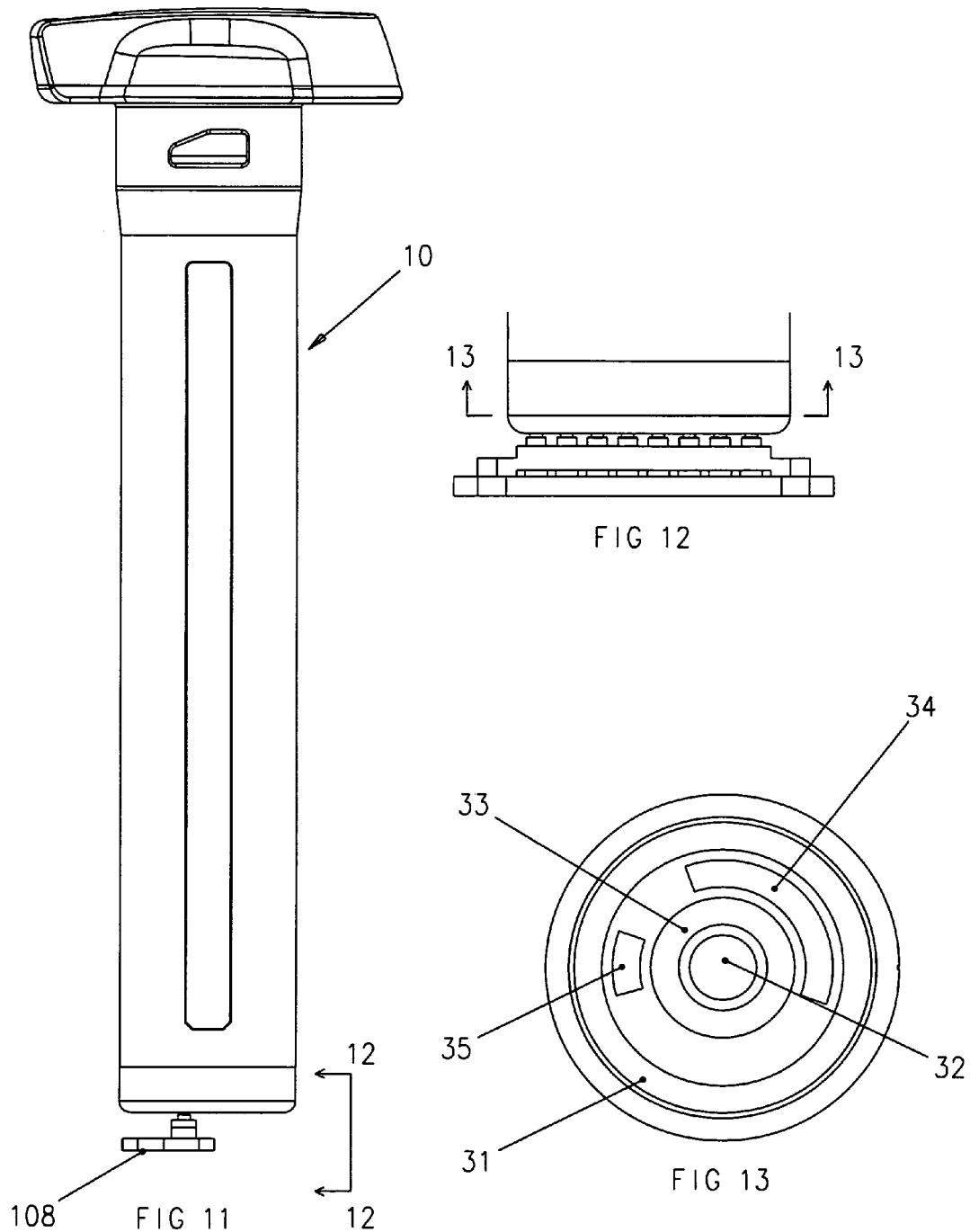

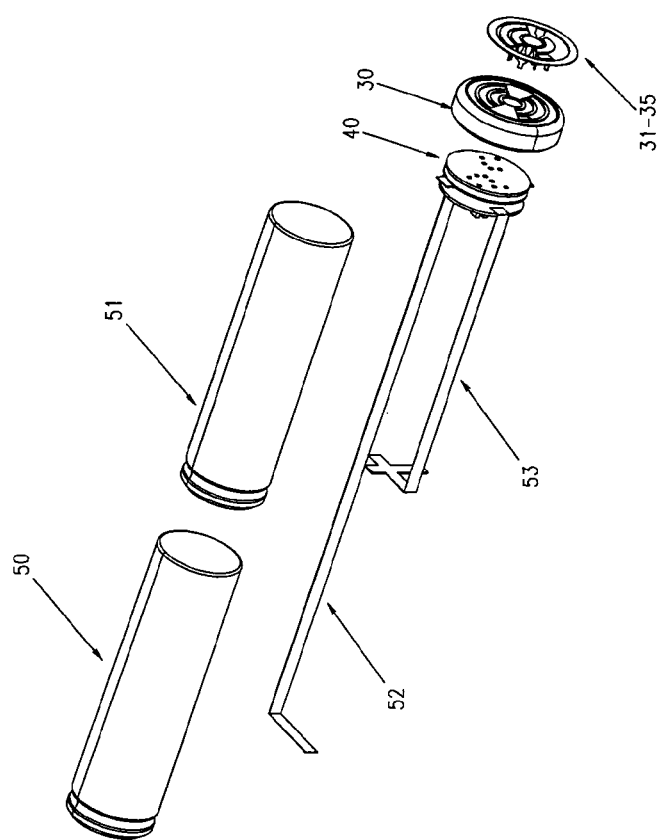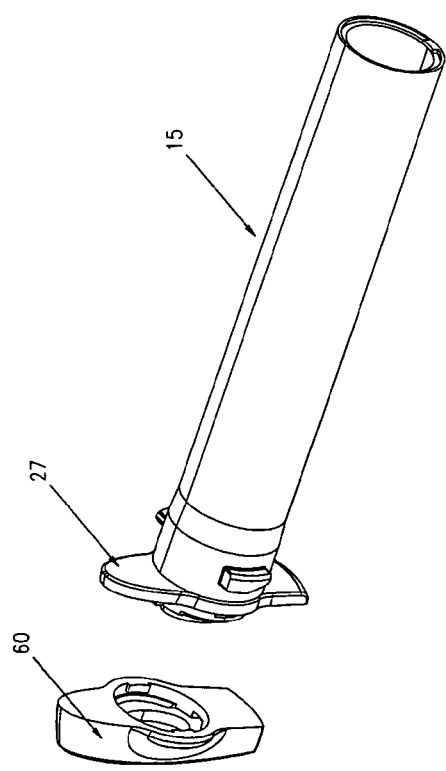
FIG 16

BATTERY PACK WITH AXIALLY EXTENDING AND ROTATABLE ELECTRICAL CONNECTIONS AND CATCH

This application claims priority on U.S. Provisional Application Ser. No. 61/203,539 filed on Dec. 22, 2008, the disclosures of which are incorporated herein by reference.

FIELD OF THE INVENTION

The present invention relates to improvements in batteries, and more particularly to batteries which are capable of providing a warning to provide adequate shut-down time of an electronic device's operating system.

BACKGROUND OF THE INVENTION

An electrical battery generally consists of one or more electrochemical cells that provide for the conversion of stored chemical energy into electrical energy. Electrical batteries have taken many different forms since the first voltaic pile was invented and used by Alessandro Volta in 1800, and today they are utilized to power both household items and industrial equipment. Batteries range in size from the small cells used in hearing aids, watches, and even newer miniature batteries for medical implantation to treat neurological disorders, to large battery packs for hybrid cars. A hybrid car battery today may comprise up to 28 nickel metal hydride modules connected in series to produce a nominal voltage exceeding 200 volts.

Batteries had for many years been designed for one-time use, only to be discarded after they were unable to support continuous functioning of the unit. Early rechargeable batteries were not very robust, as they suffered from memory effect where, in nickel cadmium batteries, repeated recharging would reduce the batteries ability to be recharged to its maximum energy capacity. But today's lithium-ion cells may be recharged multiple times and last for years, which is particularly useful for units whose operations normally require standby power, such as for cell phones, personal digital assistants (PDAs), hand-held scanners, and laptop computers.

Due to the power requirements involved in wireless communications, and particularly for mobile computing, a battery pack is often utilized, where the battery pack interconnects the electrical conductivity between any number of batteries, which are preferably identical. Many units will have a custom-designed battery and battery compartment. An example of this is shown by U.S. Pat. No. 6,421,233 to Hong for "Pocket Personal Computer with Improved Battery Compartment Enclosing Structure." Some units will merely be designed to accept ordinary rechargeable batteries, such as the "Dual Orientation Display Handheld Computer Devices" in U.S. Pat. No. 5,949,408 to Kang. The detailed disclosure in the Kang patent merely states, as to battery power and battery configuration, that "A main battery receiving area is provided by a chamber defined by a portion the hinge mechanism 25 to receive a pair of replaceable batteries" and that "A back-up battery is held by a tray 29 which is slidably received inside a chamber defined by the clamshell lid 22."

However, none of the battery pack and battery compartment designs have thus far addressed a concern of many users and manager's of those users, which is that removal of the battery out of a unit with a Microsoft operating system, particularly Windows mobile, doesn't give the operating system enough time to shut down in an "orderly" fashion. Although axial connectors may be spring loaded in compression to provide a longer contact period, such as that shown by U.S. Pat. No. 7,626,357 to Hoffman, they insufficient to adequately address the problem.

This invention solves the problem of insufficient system shut-down time during intentional or inadvertent battery disconnection, by provides a means of giving the device enough of warning about impending shut down to close down, so as to save data and keep the unit stable for when it is turned back on. The invention disclosed herein also addresses the need for an easily removable battery pack that nonetheless remains securely attached to the product after accidental dropping, and which also resists inadvertent removal and electrical disconnection.

OBJECTS OF THE INVENTION

It is an object of the invention to provide a battery pack which is capable of powering a device such as a PDA, a hand-held scanner, or a lap-top computer.

It is another object of the invention to provide a battery pack having electrical connections and circuits grouped to one end of the battery pack.

It is a further object of the invention to provide a battery pack which is received within a device to engage electrically once inserted, and throughout relative rotation.

It is another object of the invention to provide a battery pack with electrical connections that provide a warning to the device of impending battery removal and power loss to permit shutdown.

It is also an object of the invention to provide a rotatable battery pack installation with a quick-release catch that provides feedback to the user of positive locking.

It is another object of the invention to provide a battery pack with which resists unintentional removal following impact after being accidental dropped.

SUMMARY OF THE INVENTION

A battery pack may supply power to a device such as a PDA, a hand-held scanner, or a laptop computer, when inserted and rotatably locked therein. Rotational movement is advantageous in providing the capability of warning of impending battery power loss, and thus favors a cylindrical battery housing or body. The battery pack is adapted to maintain electrical connectivity with the device, once unlocked, during counter-rotation and before removal.

Electrical connectivity is provided by discrete electrical contact pads on one end of the cylindrical battery pack, each of which may form various annular shapes at different radii. Two of the electrical contact pads may serve as the positive and negative terminal respectively, and thus may be desirably located far apart. These pads may thus be the annular pad at the outer extreme of the circular end cap of the battery pack, and one annular pad at the center of the circular end cap, which is preferably an annulus with a radius of zero to form a solid filled circular contact pad. The contact pads may be insert-molded into the end cap, and may be gold-plated stainless steel. A second and third annular contact pad may each be connected to a thermistor for temperature measurements, and to a fuel gauge, where each may have electrical components mounted to a printed circuit board, which may be electrically coupled to the contact pads using soldering legs.

The battery pack preferably holds two or more rechargeable batteries, which may be lithium-ion. The two batteries may be connected in series via spot-welded sheet metal connectors. One end of the battery assembly may be directly coupled to either the printed circuit board or the appropriate electrical contact pad, and the other end of the battery assembly may be electrically coupled using a flexible printed circuit board.

The electrical contact pads are detected by spring-loaded pogo pins on the device. Electrical connectivity is maintained by a battery detect pin engaging a contact pad comprising a small annulus-segment, for only approximately fifteen degrees of counter-rotation, where its disengagement warns of impending power loss, and triggers a proper shut-down sequence to save data.

BRIEF DESCRIPTION OF THE DRAWINGS

FIG. 2 is a front view of the battery pack of the current invention.

FIG. 3 is a side view of the battery pack of the current invention.

FIG. 6A is an enlarged bottom view of the second end cap of the battery pack of the current invention.

FIG. 8A is a top view of the pogo-pin arrangement of FIG. 8.

FIG. 8B is a side view of the pogo-pin arrangement of FIG. 8.

FIG. 11 is a side view of the battery pack of the current invention engaging corresponding pogo-pins of the device.

FIG. 12 is an enlarged side view of the battery pack of the current invention engaging corresponding pogo-pins of the device.

FIG. 13 is a view of the contact pads on the bottom of the battery pack of the current invention.

FIG. 16 is an exploded view of the parts comprising the battery pack of the current invention.

DETAILED DESCRIPTION OF THE INVENTION

Figure 1:
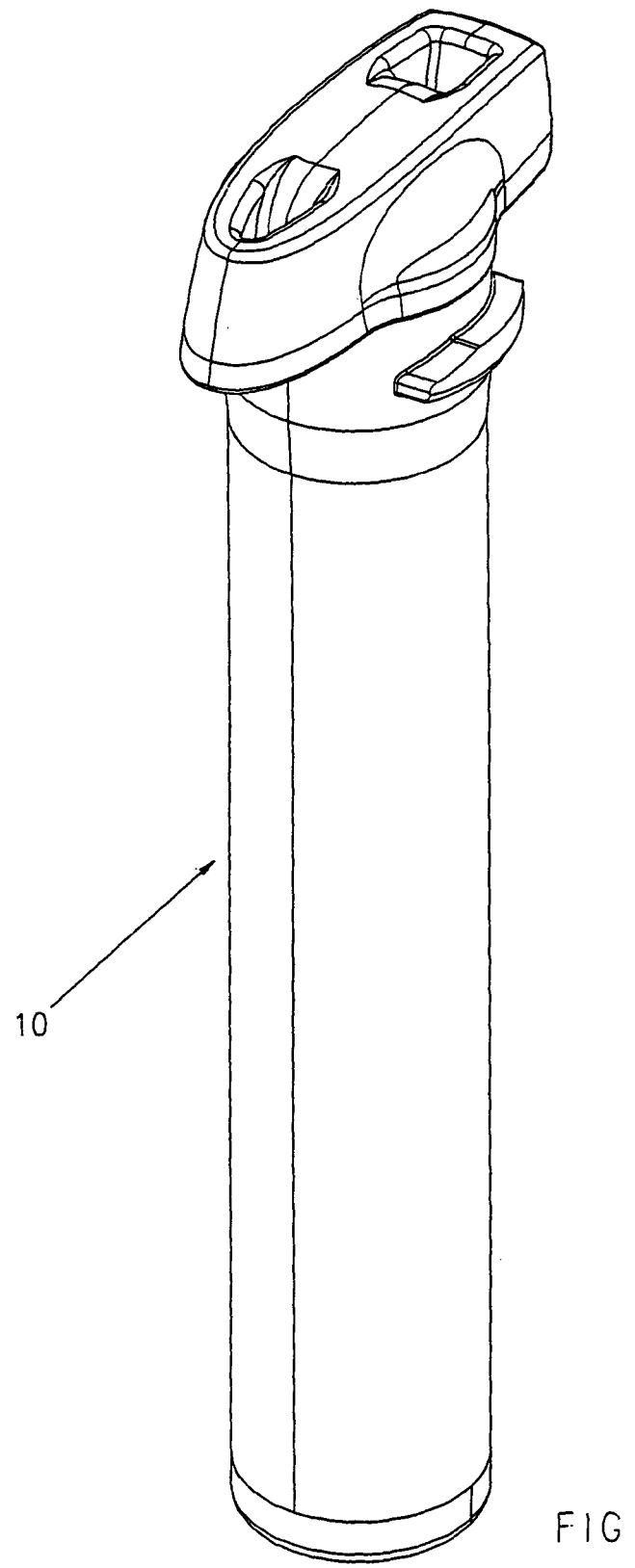
FIG. 1 is a perspective view of the battery pack of the current invention.
Figure 4:
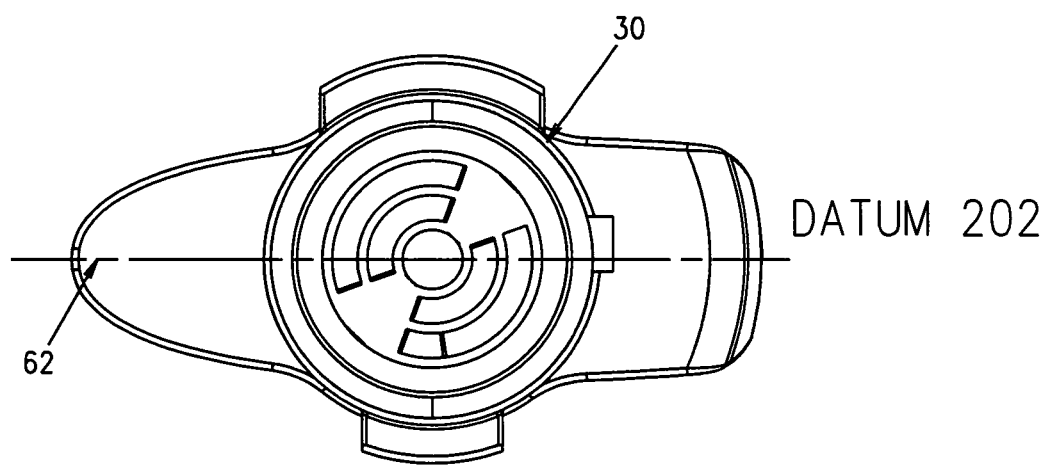
FIG. 4 is a bottom view of the battery pack of the current invention.

FIG. 1 shows a perspective view of a first embodiment of the battery pack 10 of the present invention. The battery pack is designed to preferably retain 2 or more rechargeable batteries. Since technological advances occur frequently in the area of electrochemistry, it must be emphasized that the battery pack of the present invention need not be limited to a particular type or size of battery or batteries. But currently, lithium-ion batteries demonstrate the most favorable battery chemistry for several reasons, including the fact that they do not suffer from memory effect. One of the most economical lithium-ion batteries, based upon a cost-to-energy ratio, is the 18650 battery. The 18650 lithium-ion battery is cylindrical in shape, having a diameter of 18 mm (0.7 inches) and a length of 65 mm (2.6 inches), and may have a nominal voltage of 3.7 volts Although the 18650 battery is favored for use in mobile computing and other electronic applications, it must be emphasized that the battery pack of the present invention is not limited to having a circular body or casing to encompass the battery. In fact, regardless of whether the battery is cylindrical or not, the body may be formed to have, for example, an octagonal cross-section, or even a square or other cross-section. Also, regardless of the particular cross-sectional shape utilized, it should be noted that it would likely be formed to be symmetric about an axis, to leverage as much as possible, the rotational capabilities offered herein. However, even where a battery pack body is formed by a square, octagonal, or other cross-section, it could nonetheless be formed to be eccentric to the rotational axis that is discussed hereinafter. But such an arrangement would naturally impact the envelope and support required, when housing internally within a computing device, which furthermore need not be the only application for the invention.

Since a cylindrically-shaped casing may be preferable to support use of the cylindrical lithium-ion 18650 battery, the following discussions will focus on use of one embodiment having a cylindrical tube for a casing, notwithstanding the other possible forms available for use with the invention.

Figure 5:
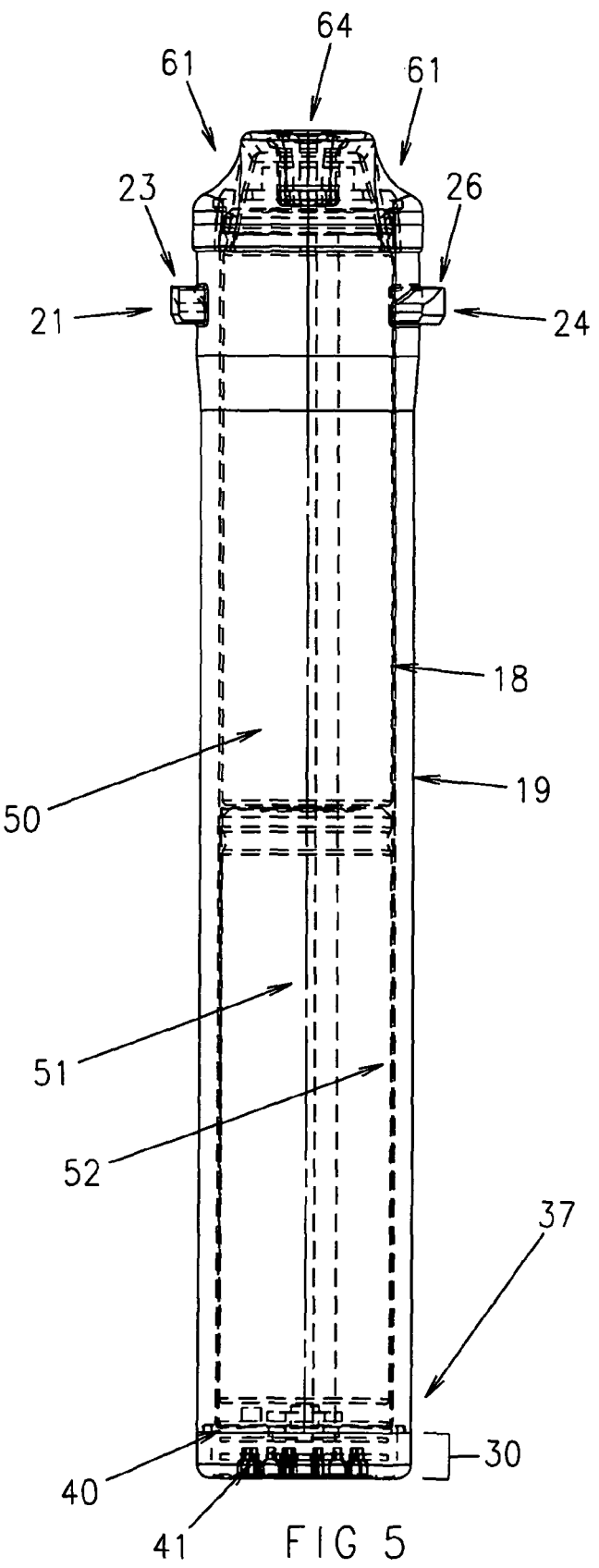
FIG. 5 is a cross-sectional view of the battery pack of the current invention.

As seen in FIGS. 2-6, the battery pack assembly 10 may have a hollow tubular body 15 symmetrically formed about axis 201, and which has a first end 16 and a second end 17 (FIG. 2), as well as an inside surface 18 and an outside surface 19 (FIG. 5). The body 15 and many of the other parts of the battery pack assembly 10 may preferably be formed of molded plastic, but are not limited solely to such material. Protruding radially outward from the outside surface 19 of the body 15 may be one or more flanges, and in a preferred embodiment, there may be a first flange 21 and a second flange 24, having a width $W_{21}$ and $W_{24}$ respectively (FIG. 6B) First flange 21 and second flange 24 are preferably clocked to be on opposite sides of tube 15, and are both also located near the first end 16 of the tube. The proximity of first and second flanges 21 and 24 to the first tube end 16 will be determined from the length of the tube 15, and its retention in a tubular opening in a device, which may have corresponding flanges (not shown) to assure appropriate electrical connectivity between the battery pack contacts and those of the device. The battery pack assembly 10 may preferably have electrical contact pads, as discussed hereinafter, disposed on one end of tubular body 15.

Figure 24:
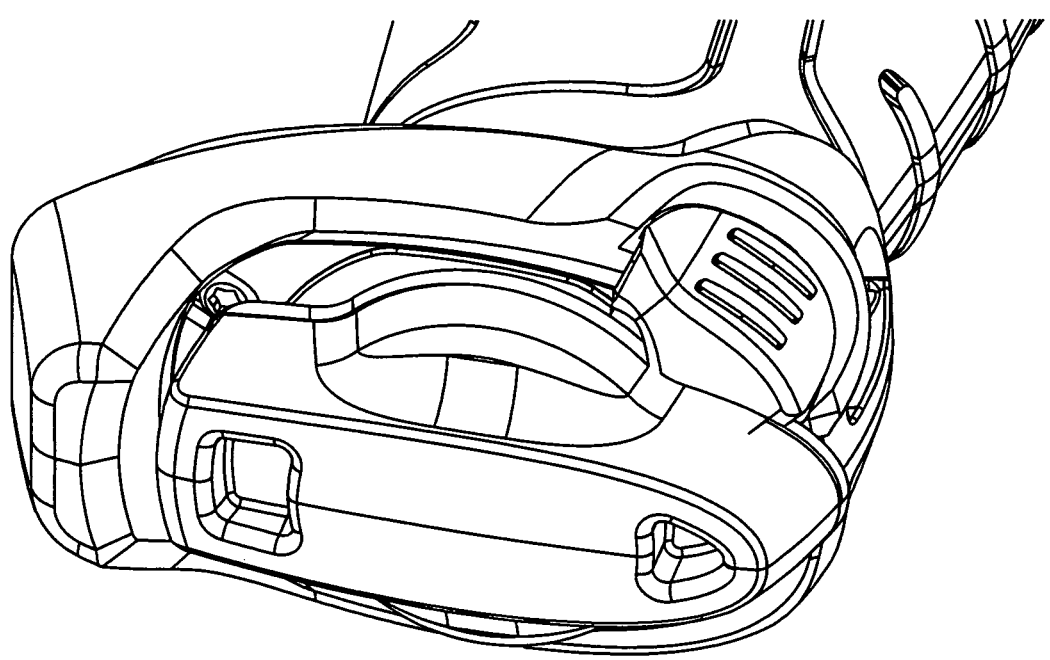
FIG. 24 is a perspective view of the battery rotated into the locked position.
Figure 25:
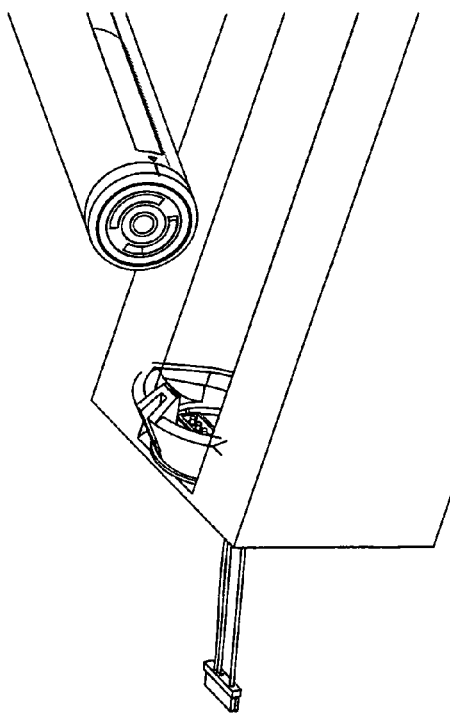
FIG. 25 is a perspective view showing the electrical contacts of the battery pack of the current invention and the corresponding spring-loaded pogo-pins of a battery charger.
Figure 26:
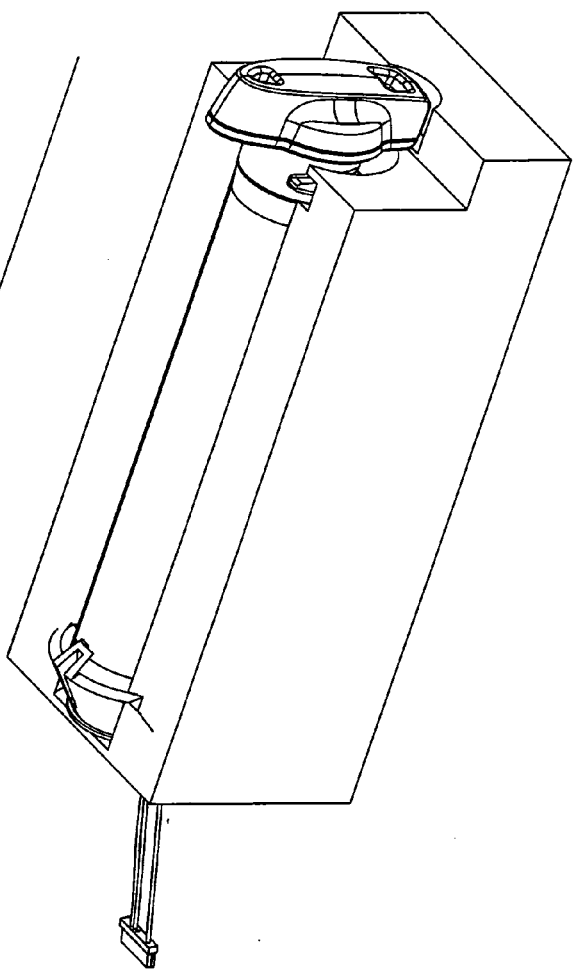
FIG. 26 is a perspective view of the battery pack of the current invention being recharged by a battery charger.

The first and second flanges 21 and 24 may preferable each have respective tapered surfaces 22 and 25, which terminate on respective engagement surfaces 24 and 26. The engagement surfaces 24 and 26 may engage the corresponding flanges in the device, as follows. The battery pack assembly 10 may be inserted into a cylindrical opening in a device (FIG. 20-23), after which rotation of the battery pack assembly 10, with motion of flanges 21 and 24 relative to the corresponding flanges in the device, would result in the tapered surfaces 23 and 25 driving the battery pack further into the opening and oppose any spring biasing therein to firmly seat the battery pack assembly 10 (FIG. 24). The battery pack assembly may be firmly located within the opening, once the respective engagement surfaces 24 and 26 of the battery pack assembly 10 contact the corresponding flanges in the device.

Figure 7:
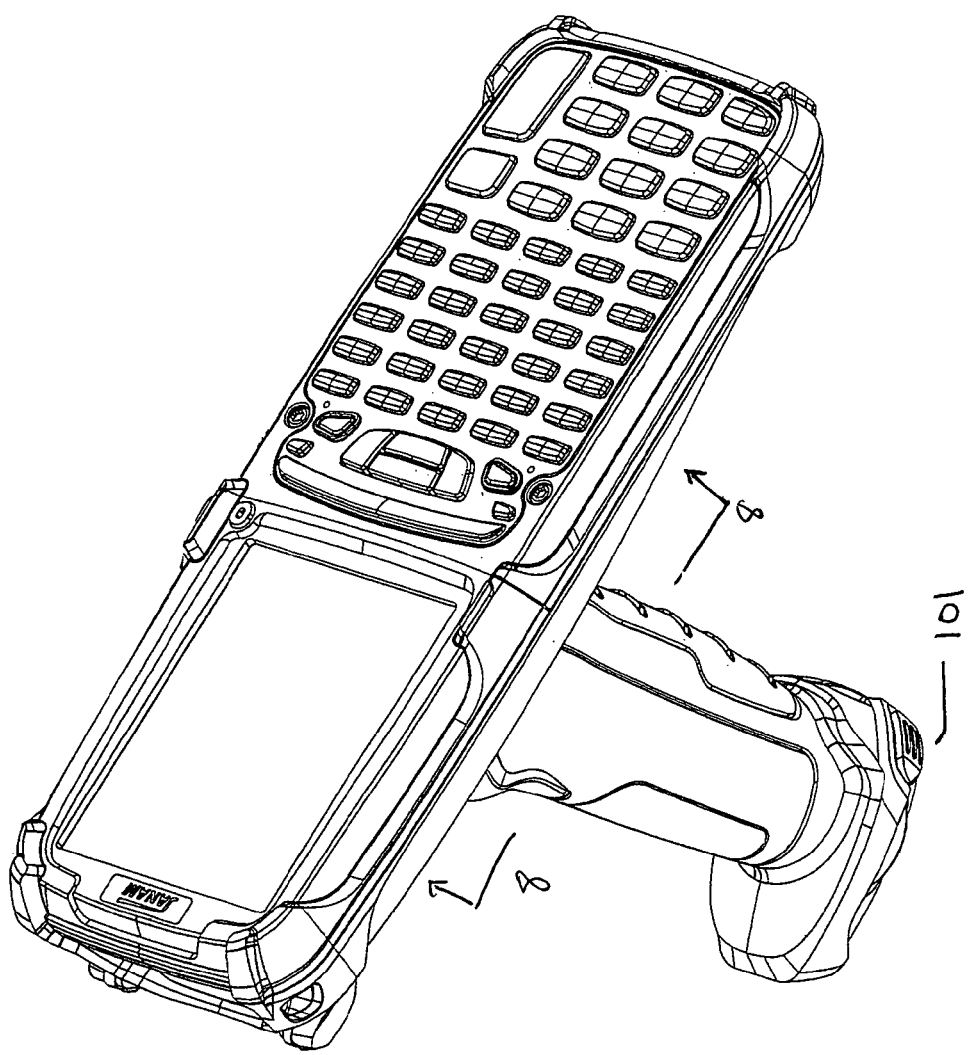
FIG. 7 is a perspective view of a gun-shaped mobile computer to be illustrative of the types of devices which may receive the battery pack of the current invention.

The battery pack may also include an O-ring seal 70 to prevent fluid from entering the tubular opening of the device and corrupting the electrical contact between the battery pack assembly 10 and the device. A gun-shaped mobile computing device 100 is shown in FIG. 7 merely to be illustrative, in later discussions, of the installation features of the present invention. The battery pack of the current invention may be used in a conventional laptop, a PDA, or other mobile computing and telecommunication products.

The battery pack assembly 10 may further comprise a first end cap 27 and a second end cap 30, to respectively enclose the first and second ends 16 and 17 of body 15. Either or both of the end caps 27 and 30 may be integrally formed with the body 15, or may be separately formed and configured, along with body 15, to be removable through use of mechanical features, including, but not limited to, use of internal and external threading on the respective parts. In FIG. 5, it may be seen that first end cap 27 is formed as part of body 15 and only partially encloses the first end 16 of body 15, but still serves to properly retain the batteries 50 and 51 within the body 15.

The second end cap 30 may incorporate a subassembly of parts, and therefore may be more conducive to being formed as a separate part. In one embodiment, the end cap 30 is formed and has those parts installed therein, after which it is attached to the second end 17 of body 15. Where the battery pack assembly 10 is not expected to provide access for replacement of the batteries, should they eventually degrade in performance, meaning the entire battery pack assembly 10 would be replaceable, the second end cap 30 may be permanently affixed to body 15 using any suitable means, including, but not limited to, ultrasonic welding.

The second end cap 30 may have an outside surface 36 and an inside surface 37. The outside surface 36 is clearly shown in the bottom view of the battery pack assembly 10 in FIG. 4, and may comprise a plurality of discrete electrical contact pads. The pads may be insert-molded into a plurality of shallow recesses (FIG. 16) in the outside surface 36 of second end cap 30, and may be formed of a appropriate electrically conductive materials, including, but not limited to gold-plated stainless steel. The number of contact pads may be determined from the electrical functionality that may be desirably incorporated into the battery pack assembly 10. In a preferred embodiment there may be five distinct electrical contact pads, pads 31, 32, 33, 34, and 35, each of which may have a uniquely formed shape.

The contact pads 31-35 may be electrically coupled to a circular printed circuit board (PCB) 40 located within the second end cap 30 using soldering legs 41. The printed circuit board 40 may connect, using a flexible printed circuit 45, to a second printed circuit board 42, which may contain the components for a fuel gauge; and a thermistor for temperature sensing. Battery terminals 52 and 53 may provide electrical coupling between batteries 50 and 51, and the printed circuit board 42.

To take advantage of the rotational capabilities offered by the invention herein, each of the electrical contact pads 31-35 may be formed into a full annulus or an annulus-segment. An annulus, simply described without use of a formula, is a circular area that has a smaller concentric circular area removed from within, to leave a ring-shape, which in geometric or mathematical terms, is referred to as an annulus. The formula for the area of an annulus mathematically depicts the literal description, being that the area, $A=\Pi (R^2-r^2)$, where "R" is the outside radius of the outer periphery of the annulus, and "r" is the inside radius of the inner periphery of the annulus. In the present invention, each of the five electrical contact pads may be a distinct annulus or annulus segment, with each having a respective beginning radius location for the inner periphery, and respective outer radius location for the outer periphery.

In a first embodiment, the electrical contact pads 31-35 may be formed as shown in FIG. 6A, where contact pad 31 is a full annulus having an outer radius, $R_{31}$ and an inner radius $r_{31}$. For the embodiment illustrated, contact pad 32 is a full circle, having an outer radius $R_{32}$ and an inner radius $r_{35}$, where $r_{35}$ equals zero. In this first embodiment, electrical contact pads 31 and 32 may be used for electrical power connectivity, serving as the negative and positive terminals respectively, and are thus herein desirably located far apart. These contact pads 31 and 32 may also be utilized when the battery pack is inserted into recharging unit to recharge the lithium-ion batteries 50 and 51. With the use of those shapes (full annulus and solid circle) for power transmission, there may always be power supplied to the device 100 while the battery pack is undergoing rotation. The power connection will only cease when the battery pack assembly 10 is removed from the device, and furthermore, with the use of spring-loaded pogo-pins within the device, as will be discussed later, the contact will not even be immediately be broken at the start of withdrawal of the battery pack assembly 10.

In the first embodiment, the electrical contact pad 33 may also be formed to be a full annulus, having an outer radius, $R_{33}$ and an inner radius $r_{33}$, where the pad 33 may provide connectivity to a thermistor, which serves as a temperature sensor. The electrical contact pad 34 may be formed to be a full annulus, but depending on the size of the batteries utilized, which affects the radius of the body 15, and depending on the optimum width of the annulus, shown by (R-r), there may not be sufficient surface area on the bottom of the second end cap 30 for a full annulus, and a part-annulus may be utilized, wherein two part-annuli at approximately the same radial location may be utilized for different functionality.

Therefore, in the first embodiment, contact pad 34 may be a part annulus having an outer radius $R_{34}$ and an inner radius $r_{34}$, with ends that are terminated at a clocking angle or position, θ, about the axis 201 relative to a datum 202, so that the annulus pad 34 may begin at $θ_{34b}$ and end at $θ_{34e}$. As shown in FIG. 6A, electrical contact pad 34 may be roughly one-third of an annulus. Lastly, electrical contact pad 35, in the first embodiment, may also be formed to be a part-annulus having the same radial dimensions as pad 34 ($R_{35}=R_{34}$, and $r_{35}=r_{34}$), but having different beginning and end clocking positions of $θ_{35b}$ and $θ_{35e}$. The contact pad 35 may serve to provide battery detection to the device.

Figure 6:
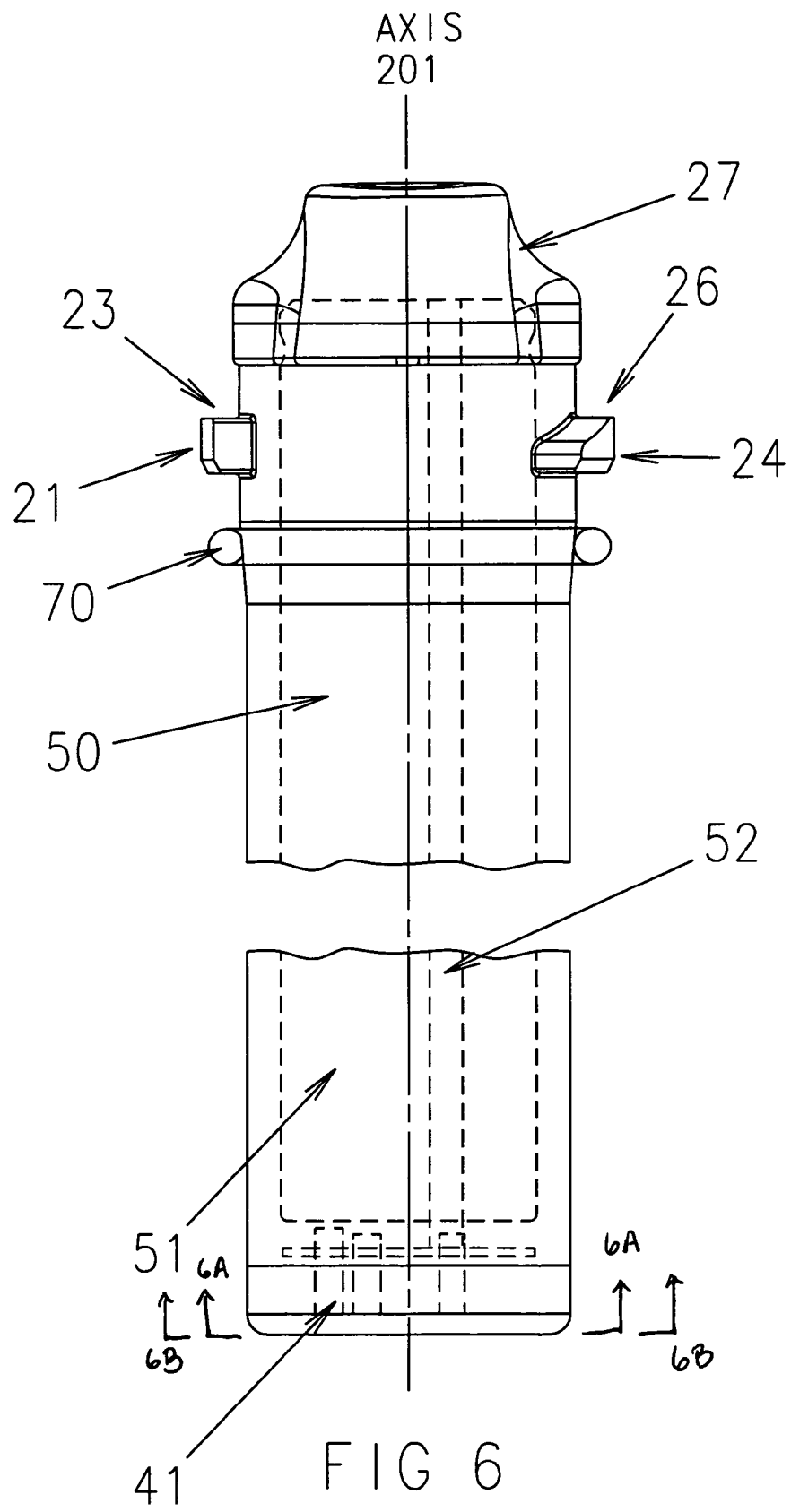
FIG. 6 is an enlarged cross-sectional view of the battery pack of the current invention.
Figure 6B:
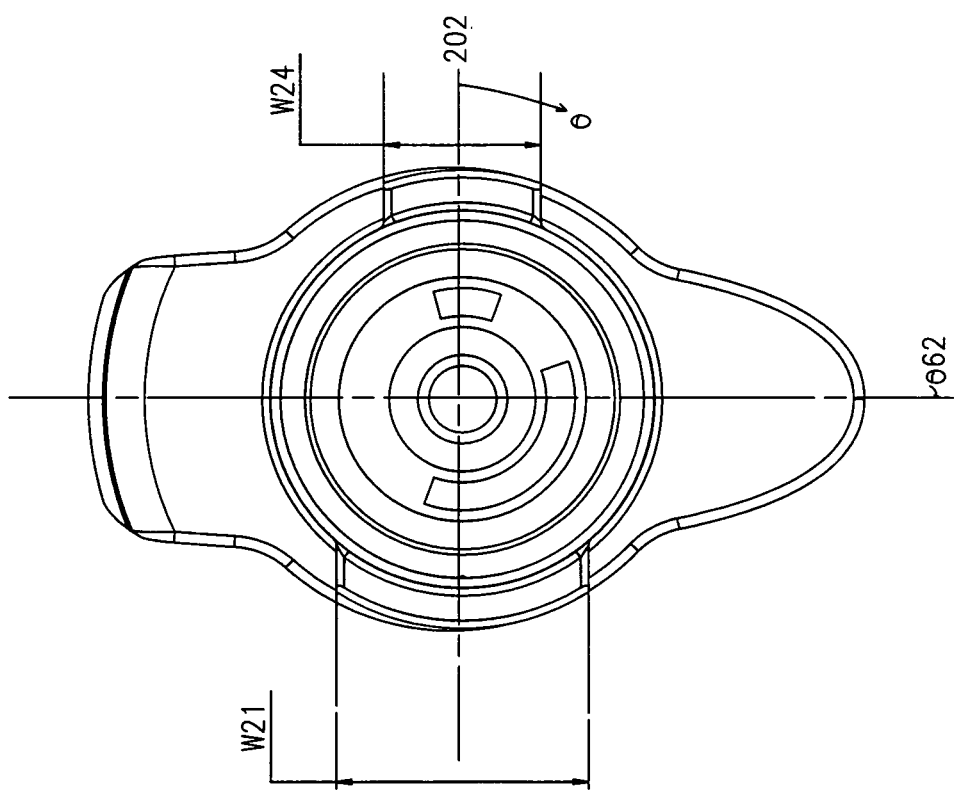
FIG. 6B is an enlarged bottom view of the battery pack of the current invention.

As shown in FIG. 6B, the engagement surfaces 23 and 26 of flanges 21 and 24 may also preferably need to be approximately clocked to correspond relatively with the orientation of datum 202, which represents the locked position of the battery pack assembly 10, and therefore assures a proper connection between the device 100 and the electrical contact pads 31-35. The flanges 21 and 24 may have radial clocking positions for its beginning and end, or alternatively, they may be defined to have respective widths $W_{21}$ and $W_{24}$, which may be symmetrically located about the datum 202.

Similarly, the battery pack assembly 10 may have a lever 60 with a pair of graspable recesses 61, and be located atop of first end cap 27. The lever 60 may also have a nose 62, and a top surface 64. The entire lever 60 or just top surface 64 may be formed of a shock-resistant material, including, but not limited to, rubber, to improve the durability of the battery pack assembly 10 in resisting damage to itself, as well as damage to the computing device 100 as a result of impact loading from being accidentally dropped. The lever 60 may be over-molded onto the first end cap 27. First end cap 27 may simply be a circular-shaped, or it may, as in FIG. 16, extend outward to provide support for the rubber lever 60. The lever 60 may also have a nose engagement surface 63, which may preferably require the lever 60 to also be clocked with respect to the datum 202 at an angle $θ_{60}$, to assure proper engagement of flanges 21 and 24 with the corresponding flanges in the device, when the catch 101 engages the lever 60 of the battery pack assembly 10. As may be seen from the Figures and the following discussion, the lever 60 may alternatively have both ends formed into a nose 62 (not shown), so that the battery pack may have two possible installation orientations being 180 degree apart.

Figure 9:
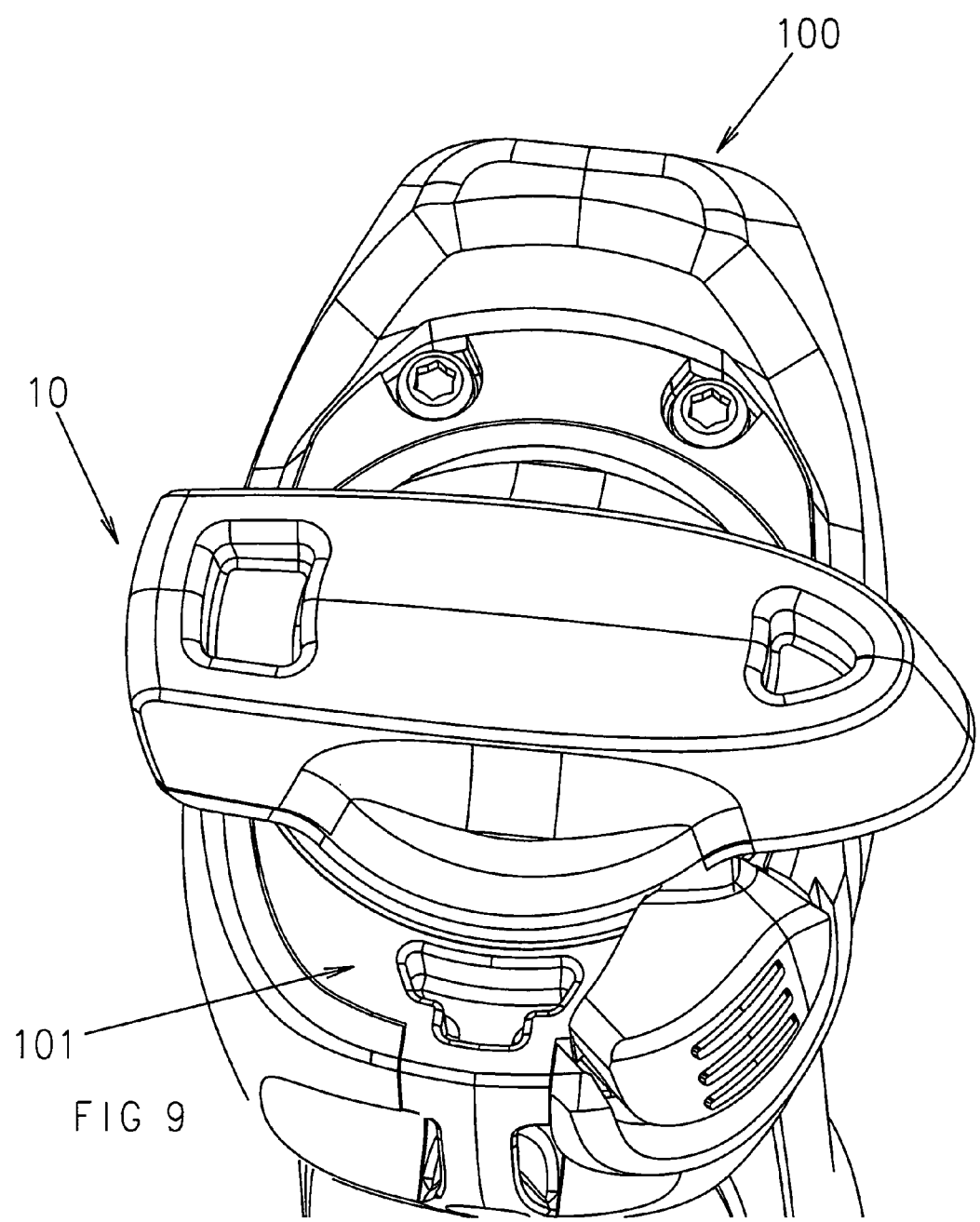
FIG. 9 is an upward looking perspective view of the battery pack of the current invention, as installed and locked in the device of FIG. 8.
Figure 10:
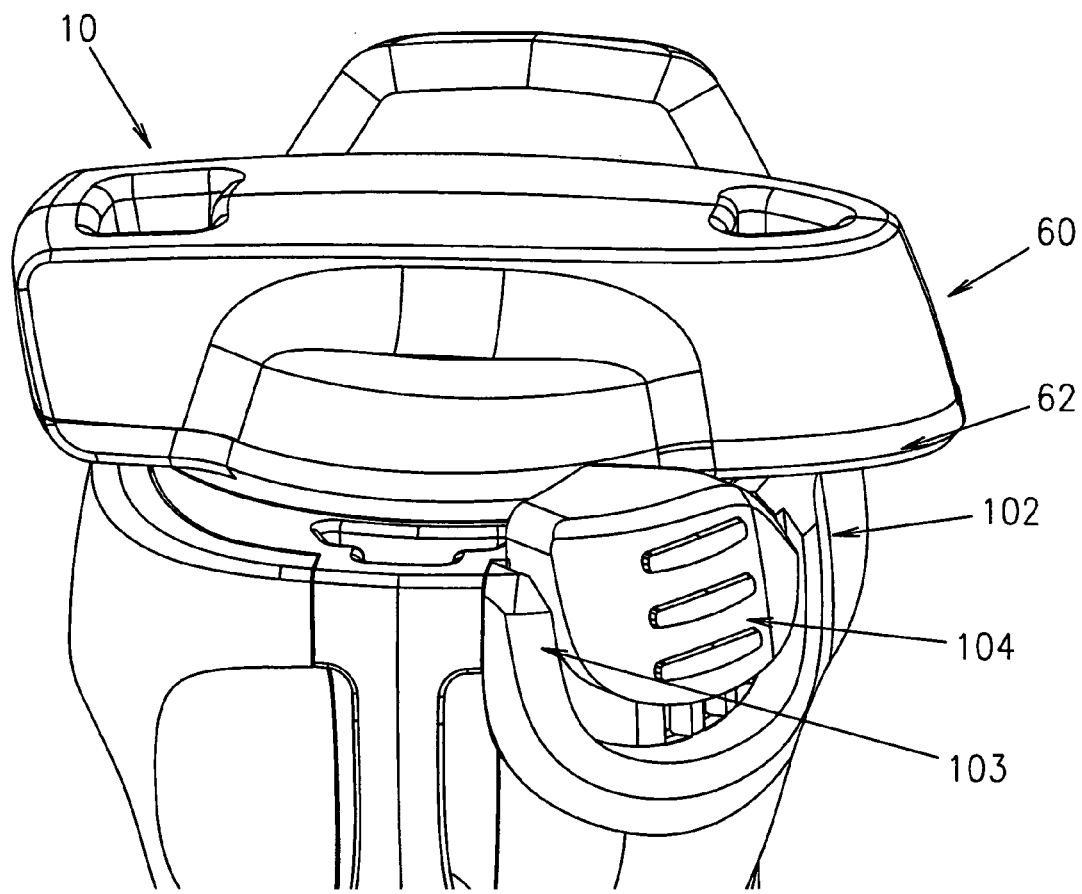
FIG. 10 is a perspective view of the battery pack of the current invention, shown in the rotated position, and locked by the catch of the device of FIG. 8.

Therefore, this coordinated orientation may preferably also exist with respect to the spring loaded mechanical catch 101 (FIGS. 7, 9-10), and at least some of the pogo-pins within the device. When the battery pack assembly 10 is inserted into the device 100, and is being rotated, which may provide proper engagement of the flanges 21 and 24 with the corresponding flanges on the device, the mechanical catch 101 may be depressed to allow the nose to pass over the catch, after which the catch 101 would spring back to its extended position, and the vertical retention surface 103 of the catch 100 would serve to prevent unintentional counter-rotation of battery pack assembly 10. In addition, the spring loaded mechanical catch 100 may have a sloping engagement surface 102, which, when contacted by the nose engagement surface 63 of the lever 60, would be automatically deflected downward—not requiring manual deflection—and would pop up or "click" back into its extended position after the lever has finished rotating into the final locked position. Additionally, the flanges 21 and 24 and the corresponding flanges on the device may have protrusions (not shown) to serve as a stop, and prevent over-rotation of the battery pack assembly 10 during its installation to assure proper engagement of the electrical contact pads 31-35.

Figure 8:
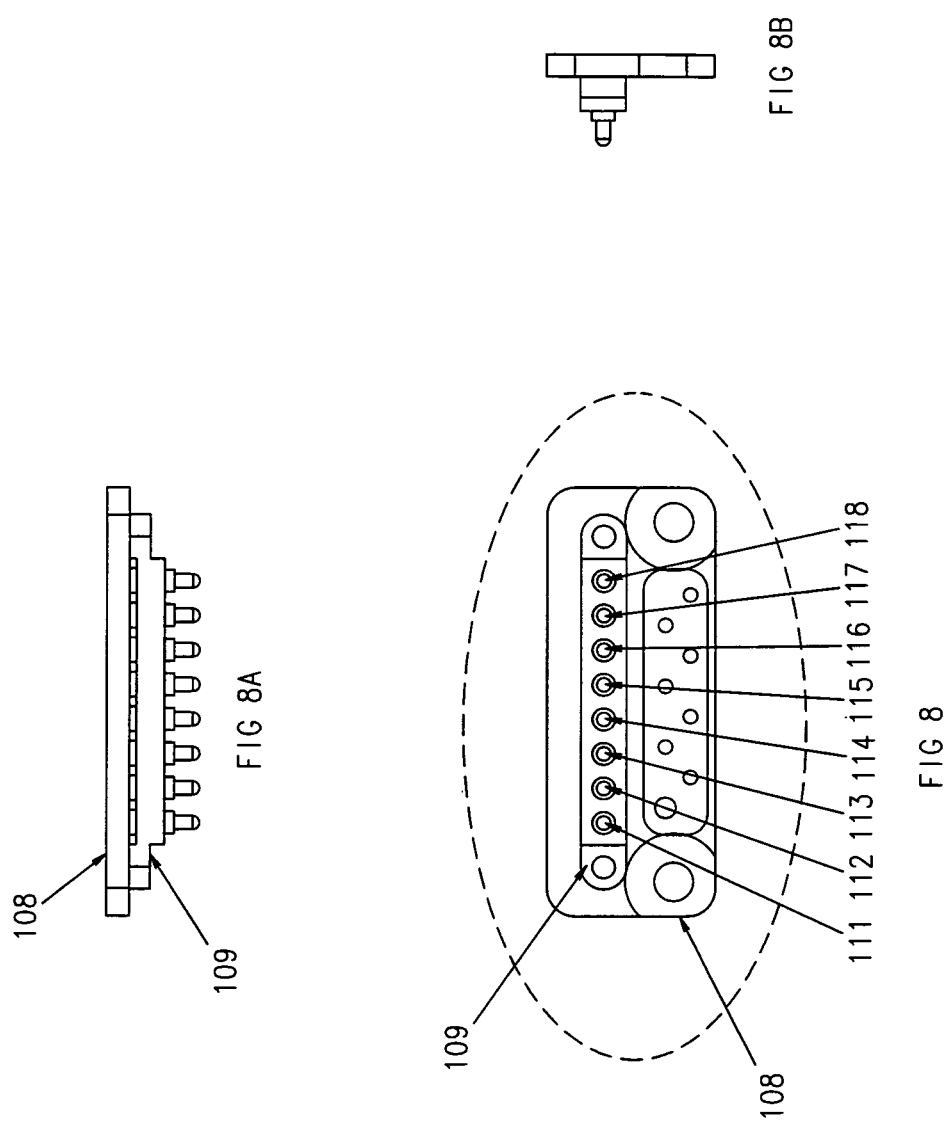
FIG. 8 is a view of the pogo-pins and support, as utilized in the device of FIG. 7.

The nature of the electrical connections described herein form an essential part of the current invention. As shown in FIGS. 7 and 8A-8B, the device that seeks to properly utilize the battery pack assembly 10 of the current invention may preferably have a battery compartment (not shown) with a plurality of spring-loaded pogo-pins arranged therein. There are a number of different arrangements which may work successfully, as will be elaborated on later, but in a preferred arrangement in FIG. 8, there may be a base plate 108 to which is attached a pogo-pin support 109. Pogo-pin support 109 may preferably house a plurality of spring loaded pogo-pins 111-118. The pogo-pins 111-118 may preferably be arranged in a line. FIGS. 11-13 show the battery pack assembly 10 contacting and depressing the spring-loaded pogo-pins 111-118, and the perspective views in FIGS. 14 and 15 illustrate the advantageous nature of the battery pack assembly 10 of the current invention.

Figure 14:
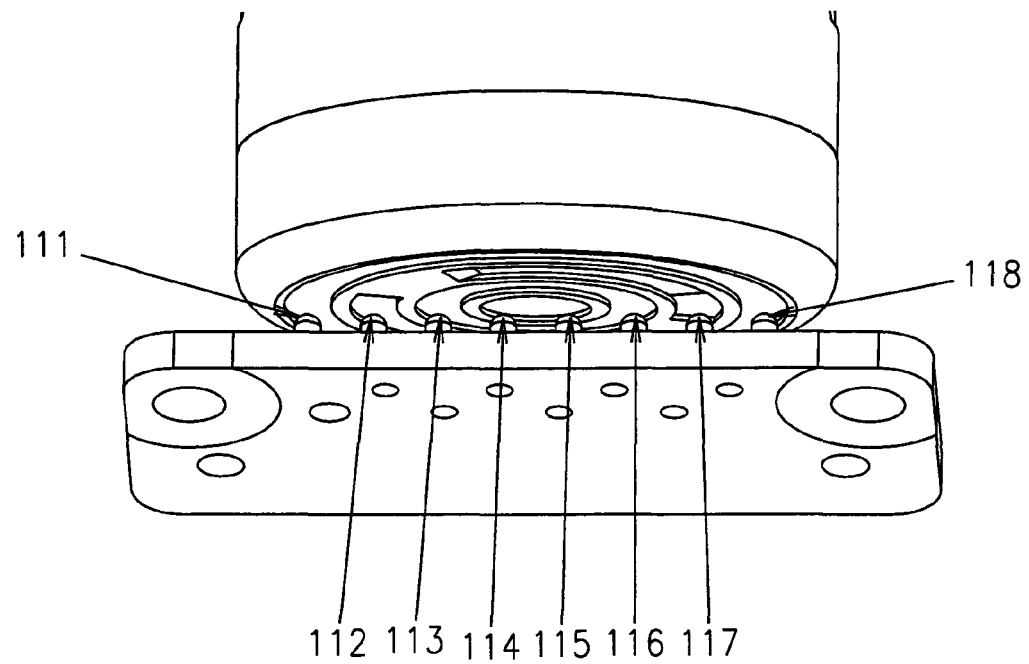
FIG. 14 is a perspective view of the battery pack of the current invention engaging corresponding pogo-pins of the device.
Figure 14A:
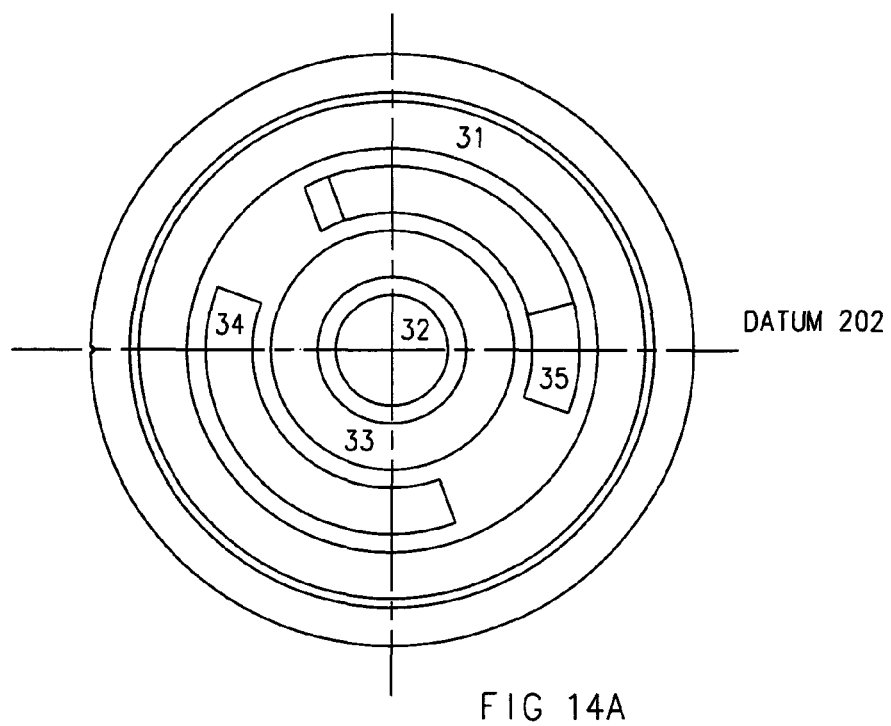
FIG. 14A is an enlarged view of the contact pads on the bottom of the battery pack of the current invention.
Figure 15:
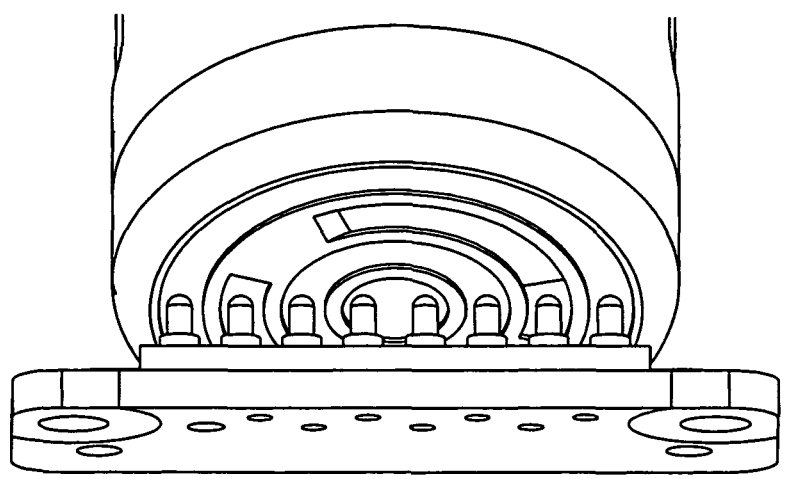
FIG. 15 is a reverse perspective view of the battery pack of the current invention engaging corresponding pogo-pins of the device.
Figure 17:
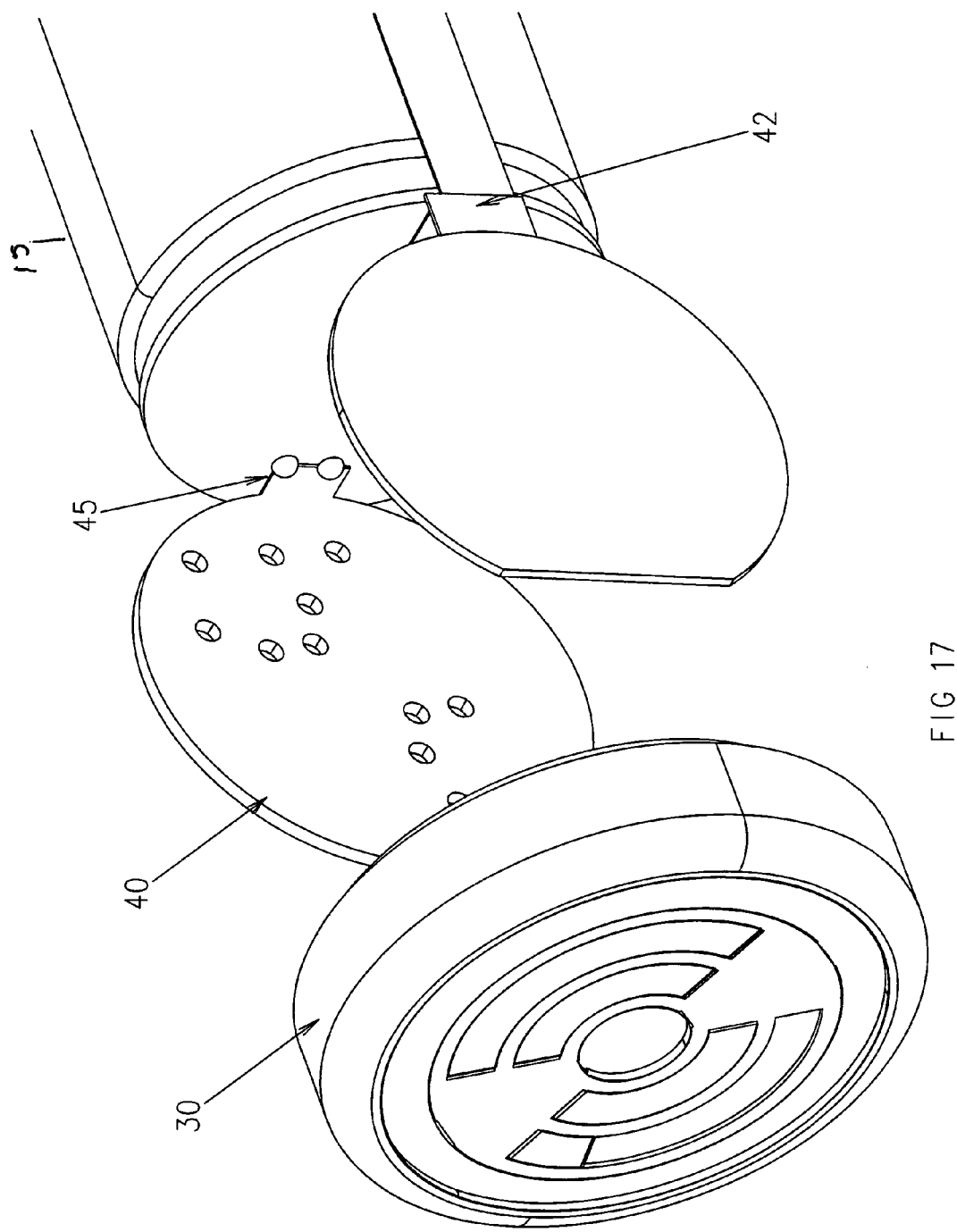
FIG. 17 is an exploded view of the end cap, circular printed circuit board, and body of the battery pack of the current invention.
Figure 18:
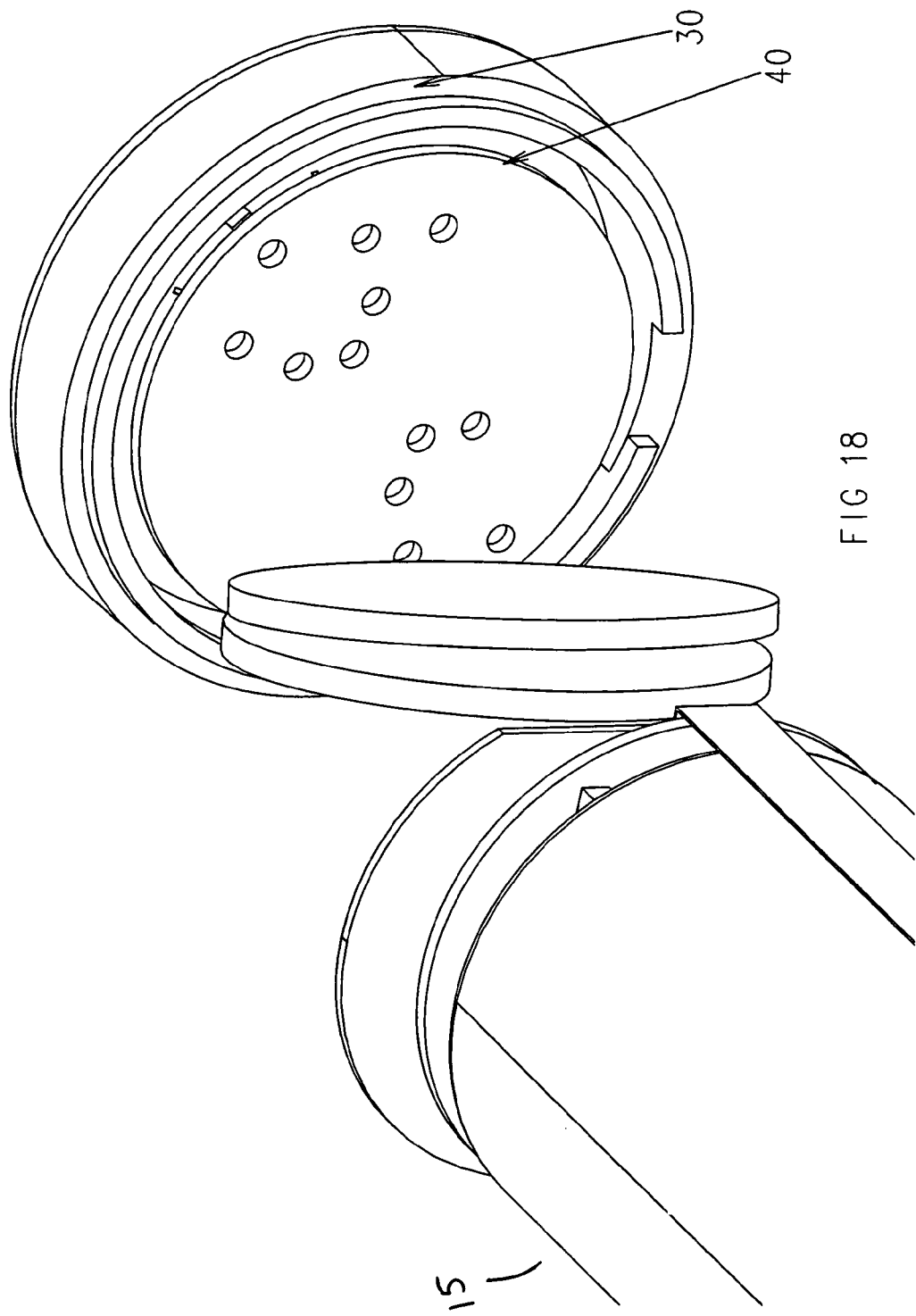
FIG. 18 is a reverse exploded view of the end cap, circular printed circuit board, and body of the battery pack of the current invention.
Figure 19:
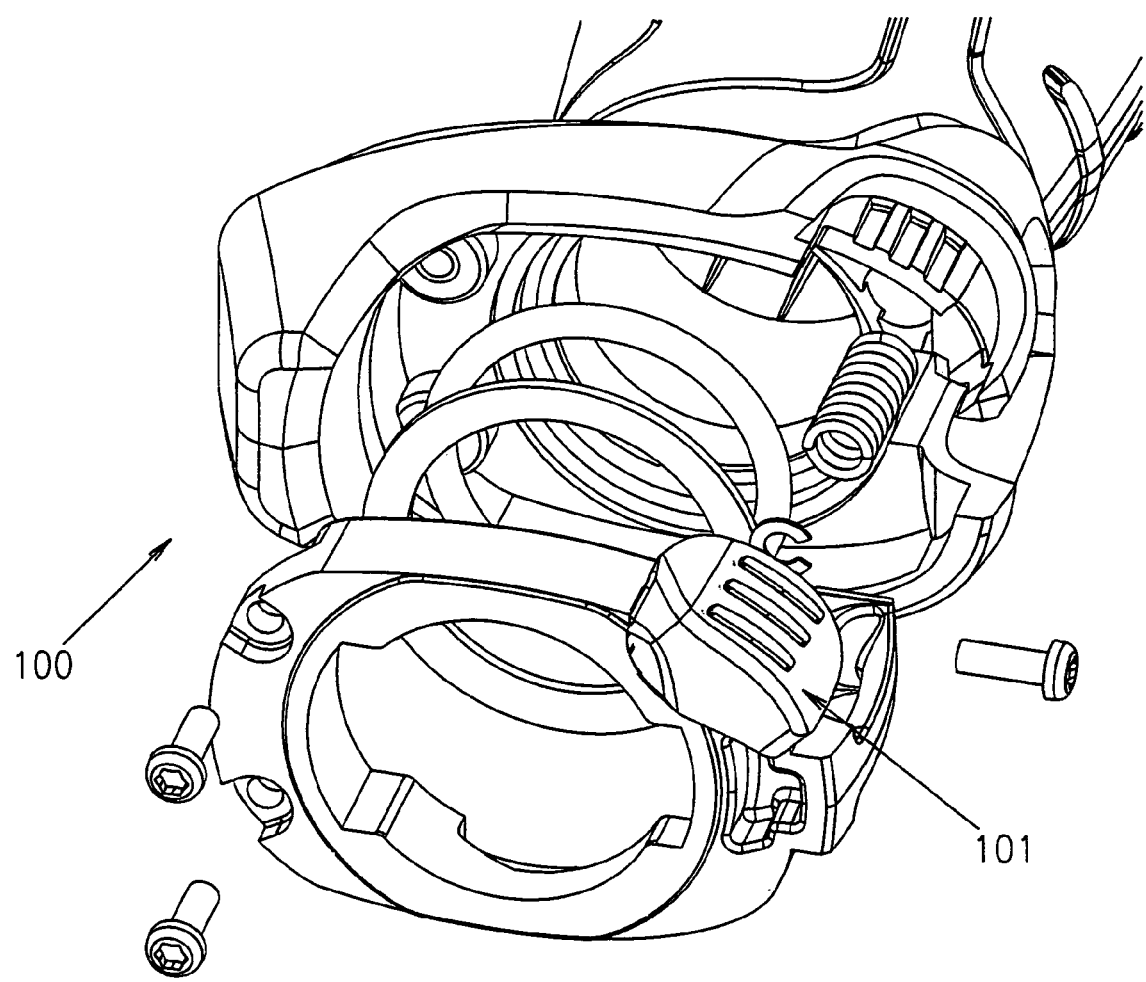
FIG. 19 is an exploded view of the parts comprising the battery opening of the device of FIG. 7.
Figure 20:
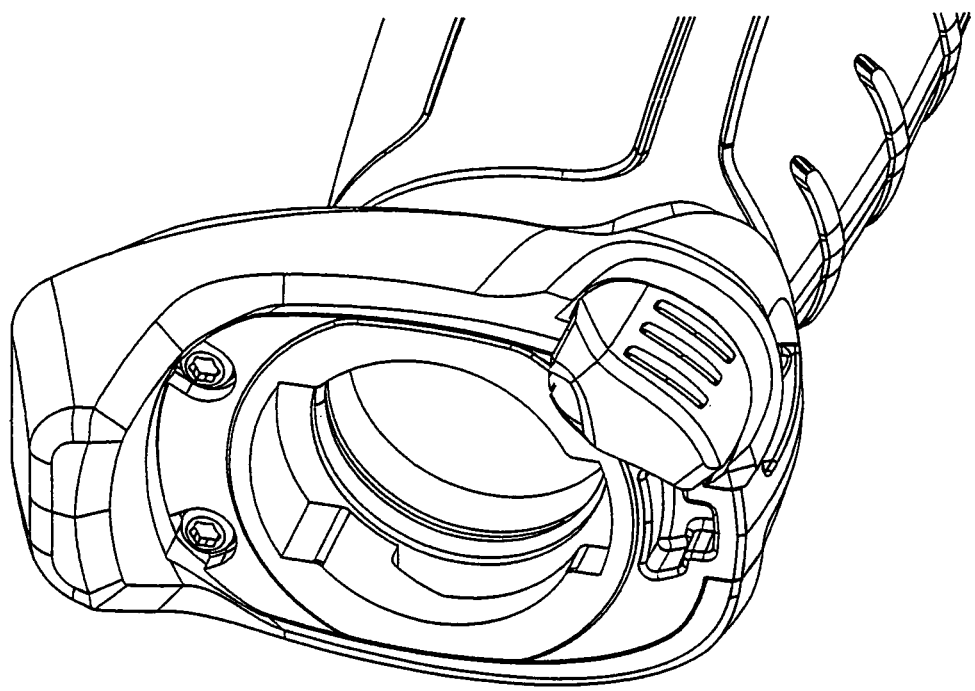
FIG. 20 is a perspective view of the opening into the battery compartment of the device of FIG. 7.
Figure 21:
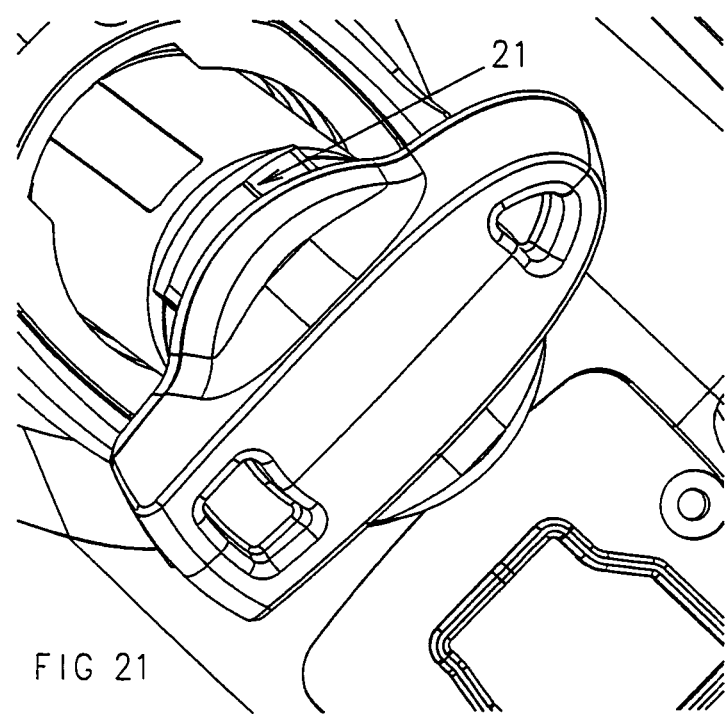
FIG. 21 is a perspective view showing insertion of the battery pack of the current invention being inserted into the device of FIG. 7.
Figure 22:
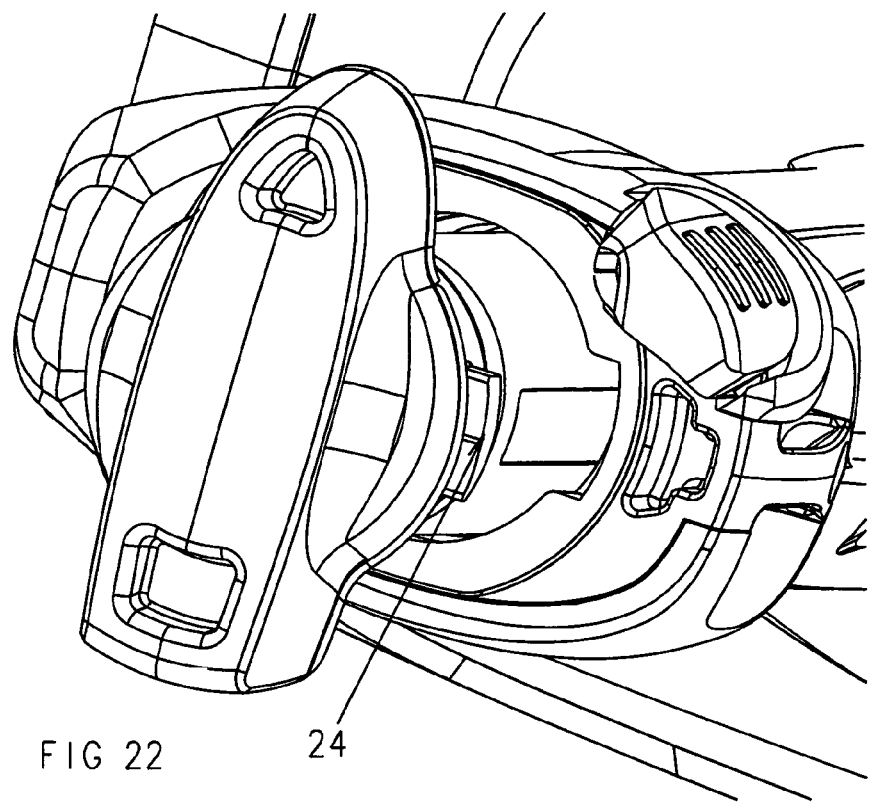
FIG. 22 is a reverse perspective view showing insertion of the battery pack of the current invention being inserted into the device of FIG. 7.
Figure 23:
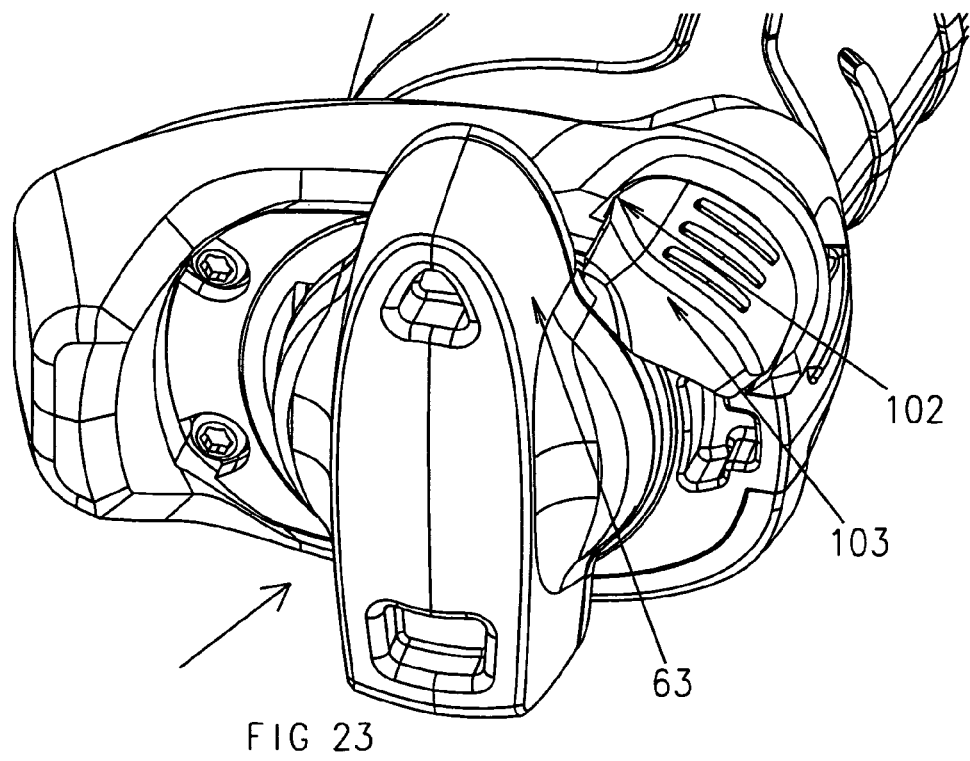
FIG. 23 is a perspective view of the battery completely inserted into the battery compartment of the device of FIG. 7.

In FIG. 14, pogo-pin 117 is in contact with electrical contact pad 35 to provide battery sensing, which is integral to a proper shut-down. The annulus-segment comprising the electrical contact pad 35 may be small, but only need sweep out a smaller annulus-segment than the contact pads 31 and 32 which are supplying power to the device. Since contact pads 31 and 32 each comprise a full annulus, contact pad may theoretically be an annulus-segment of any sweep being less than 360 degrees. In practice, disengagement of the battery detect pin from the fifth contact pad 35 preferably occurs for counter-rotation of the battery pack relative to the pogo-pin of the device in the range of approximately 2 degrees to 40 degrees. Disengagement more preferably occurs for counter-rotation in the range of approximately 5 degrees to 30 degrees, and most preferably occurs for counter-rotation in the range of approximately 10 degrees to 20 degrees. However, in a preferred embodiment, electrical contact pad 35 may provide contact with the pogo-pin 117 for approximately 15 degrees of battery pack assembly 10 counter-rotation (for removal) before disconnecting.

While the pogo-pin 117 contacts the pad 35, the device 100 senses the presence of the battery. Once counter-rotation has caused pogo-pin 117 to no longer contact the pad 35, the system may acknowledge the impending loss of power, and begin a proper shut-down sequence to save data before power is completely lost. Utilizing annulus-segments that permit substantially greater than fifteen degrees of rotation before disconnection, for the positive and negative terminals (contact pads 31 and 32), allows time for the device 100 to remain supplied with power to complete the shutdown. Utilizing a full annulus for the positive and negative terminals simplifies the design and allows the battery to be inserted into the device in one of two different orientations, those being 180 degrees apart.

Figure 14B:
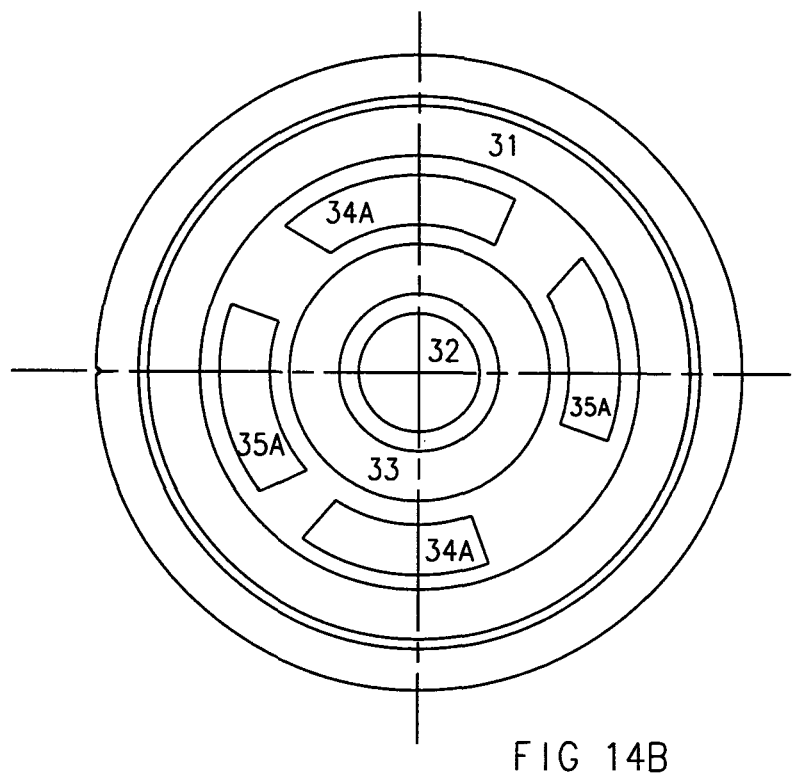
FIG. 14B is an enlarged view of an alternate embodiment of the contact pads on the bottom of the battery pack of the current invention.

As seen in FIG. 14, pogo-pins 111 and 118 are both in contact with the electrical contact pad 31 (the negative terminal), which provides redundancy, and therefore a more robust design, so that where there may be skewing of the battery pack assembly 10 relative to the device 100 (FIG. 15), due to misalignment from loose manufacturing tolerances, or manufacturing defects, or other reasons, at least one of the pogo pins will still contact the pad 31. The same arrangement may be provided with respect to the electrical contact pad 32 (the positive terminal), whereby it may have two pogo-pins-pins 111 and 118—both in contact with the solid circular electrical contact pad 32. The same may also be true of electrical contact pad 33, which is coupled with the thermistor, so that there is redundant pin contact with pogo-pins 113 and 116. Lastly, the contact pad 34 may be an annulus-segment of a certain length and be located 180 degrees opposite to the battery detection, and therein contact pogo-pin 112. Alternatively, if a non-linear arrangement of pogo-pins is utilized, two contact pads 34A may be utilized in two separate radial positions, and be disposed approximately 90 degrees relative to the battery detection contact pad 35A, which itself may be redundantly positioned 180 degrees about datum 202 (FIG. 14B).

The examples and descriptions provided merely illustrate a preferred embodiment of the present invention. Those skilled in the art and having the benefit of the present disclosure will appreciate that further embodiments may be implemented with various changes within the scope of the present invention. Other modifications, substitutions, omissions and changes may be made in the design, size, materials used or proportions, operating conditions, assembly sequence, or arrangement or positioning of elements and members of the preferred embodiment without departing from the spirit of this invention.

The invention claimed is:

1. A battery pack, said battery pack comprising a hollow body, a first end cap, and a second end cap; said body being formed about an axis and having first and second ends; said first and second end caps enclosing said body, said second end cap comprising an inner surface and an outer surface, said outer surface having a plurality of discrete electrical contact pads, each of said plurality of electrical contact pads beginning at a respective first radius from said axis and ending at a respective second radius from said axis, each of said plurality of electrical contact pads having a first end at a first respective clocking position, and a second end at a second respective clocking position; at least one of said plurality of discrete electrical contact pads being electrically coupled to said inner surface of said second end cap, and at least another one of said plurality of discrete electrical contact pads being electrically coupled to an inside surface of said first end cap.

2. The battery pack according to claim 1 wherein angular displacement about said axis between said first and said second respective clocking positions for at least one of said plurality of electrical contact pads is less than angular displacement for each remaining of said plurality of electrical contact pads.

3. The battery pack according to claim 2 wherein said contact pads are insert-molded into said first end cap.

4. The battery pack according to claim 3 wherein said contact pads are gold-plated stainless steel.

5. The battery pack according to claim 4 wherein at least one of said first and second end caps is removably attached to said body.

6. The battery pack according to claim 4 wherein at least one of said first and second end caps is ultrasonically sealed to said body.

7. The battery pack according to claim 4 wherein said second end cap further comprises a lever attached thereto.

8. The battery pack according to claim 7 wherein said body is capable of retaining at least one battery.

9. The battery pack according to claim 8 wherein said electrical coupling between said at least one of said plurality of discrete electrical contact pads and said inside surface of said first end cap is by a first battery terminal; and wherein said at least another one of said plurality of discrete electrical contact pads being electrically coupled to an inside surface of said second end cap is by a second battery terminal.

10. The battery pack according to claim 9 wherein said battery is a rechargeable lithium-ion battery.

11. The battery pack according to claim 10 wherein two or more of said plurality of discrete electrical contacts pads may be connected to a recharging source to recharge said lithium-ion battery.

12. The battery pack according to claim 11 wherein said battery pack is installed in a cylindrical opening in a device to power said device.

13. The battery pack according to claim 12 wherein when said battery pack is inserted in said cylindrical opening of said device, one or more of said plurality of discrete electrical contact pads on said outer surface of said first end cap are electrically coupled to said device.

14. The battery pack according to claim 13 wherein said electrical coupling between said battery pack and said device comprises a terminal in said device.

15. The battery pack according to claim 14 wherein said terminal comprises a plurality of spring loaded pogo-pins, and wherein at least one pogo-pin contacts each of said plurality of discrete electrical contacts.

16. The battery pack according to claim 15 wherein said battery pack may be rotated relative to said device, said one or more of said plurality of discrete electrical contact pads on said outer surface of said first end cap remaining electrically coupled to said spring loaded pogo-pins.

17. The battery pack according to claim 16 wherein said body further comprises one or more flanges, said one or more flanges protruding radially outward from said body.

18. The battery pack according to claim 17 wherein at least a portion of each of said one or more flanges further comprises a tapered surface, and wherein said rotation of said battery pack causes said one or more flanges to engage one or more corresponding flanges on said device to inhibit removal of said battery pack case from said cylindrical opening of said device.

19. The battery pack according to claim 18 wherein said rotation of said battery pack comprises rotating said battery pack about said axis of said battery pack, said rotation being relative to said device.

20. The battery pack according to claim 19 wherein said rotation of said battery pack causes said lever to engage a spring-loaded catch on said device, said spring-loaded catch releasably inhibiting counter-rotation of said battery pack in a locked position.

21. The battery pack according to claim 20 wherein said body is molded plastic.

22. The battery pack according to claim 21 wherein said lever is shock-absorbing.

23. The battery pack according to claim 22 wherein said lever is formed of rubber, said rubber being over-molded onto said body.

24. The battery pack according to claim 23 wherein an O-ring seals said battery pack relative to said device.

25. The battery pack according to claim 24 wherein at least one of said plurality of discrete electrical contact pads has said first radius being greater than zero with said second radius being greater than said first radius, and having an angular displacement between said first and second respective clocking positions of 360 degrees to form a contact pad in the shape of an annulus.

26. The battery pack according to claim 25 wherein one of said plurality of discrete electrical contact pads has said first radius being equal to zero with said second radius being greater than zero, and has angular displacement between said first and second respective clocking positions of 360 degrees to form a filled circular-shaped contact pad.

27. The battery pack according to claim 26 wherein said filled circular-shaped contact pad serves as a positive electrical terminal; and wherein one of said annular-shaped contact pads serves as a negative electrical terminal, said negative terminal having the largest respective first and second radii.

28. The battery pack according to claim 27 wherein another of said annular-shaped contact pads is coupled to a temperature sensor.

29. The battery pack according to claim 28 wherein a fourth pad of said plurality of electrical contact pads is shaped to form an annulus-segment, said fourth contact pad being electrically connected to a fuel gauge.

30. The battery pack according to claim 29 wherein a fifth pad of said plurality of electrical contact pads is shaped to form an annulus-segment, said fifth contact pad serving to provide battery detection to said device.

31. The battery pack according to claim 30 wherein said annular-shaped contact pad for said temperature sensor, said contact pad for said fuel gauge, and said contact pad for said battery detection are each electrically coupled to a printed circuit board assembly using soldering legs.

32. The battery pack according to claim 31 wherein said printed circuit board assembly comprises components for said fuel gauge, and a thermistor to measure temperature.

33. The battery pack according to claim 32 wherein said fifth pad is clocked about said axis relative to said lever such that when said battery pack is in said locked position, said fifth pad is electrically coupled to said device using a battery detect pin, said device detecting presence of said battery power.

34. The battery pack according to claim 33 wherein when said catch is toggled, counter-rotation of said battery pack causes disengagement of said battery detect pin from said fifth pad, said disengagement causing said device to initiate a proper shut-down.

35. The battery pack according to claim 34 wherein said disengagement of said battery detect pin from said fifth pad preferably occurs for counter-rotation in the range of approximately 2 degrees to 40 degrees.

36. The battery pack according to claim 35 wherein said disengagement of said battery detect pin from said fifth pad more preferably occurs for counter-rotation in the range of approximately 5 degrees to 30 degrees.

37. The battery pack according to claim 36 wherein said disengagement of said battery detect pin from said fifth pad most preferably occurs for counter-rotation in the range of approximately 10 degrees to 20 degrees.

38. The battery pack according to claim 37 wherein said disengagement of said battery detect pin from said fifth pad occurs for counter-rotation at approximately 15 degrees.

39. The battery pack according to claim 38 wherein said body has a circular cross-section to form a hollow cylinder.

40. The battery pack according to claim 35 wherein said body has an octagonal cross-section.

41. A battery pack, for use in an electronic device, said battery pack being capable of supplying power to a device when inserted into said device and rotated to be locked therein; said battery pack being adapted to maintain electrical connectivity with said device when unlocked and counter-rotated, said electrical connectivity being maintained for a substantial portion of battery pack counter-rotation necessary to mechanically disengage said battery; said electrical connectivity being provided by a plurality of discrete annular-shaped electrical contact pads on said battery pack, each of said annular-shaped contact pads being roughly co-planar on an end of said battery pack; one of said plurality of discrete electrical contact pads being electrically coupled to a negative terminal within said battery pack, a second of said plurality of discrete electrical contact pads being electrically coupled to a positive terminal within said battery pack, and a third of said plurality of discrete electrical contact pads being adapted to provide electrical connectivity during only a first portion of counter-rotation, wherein termination of electrical connectivity of said third of said plurality of contact pads signals impending battery disconnection and power loss.

42. In an electronic device, a battery pack assembly and a battery compartment, said battery pack assembly comprising a body, a first end cap, and a second end cap;

said body being formed about an axis and having first and second ends; said first and second end caps enclosing said body, said second end cap further comprising an inner surface and an outer surface, said outer surface having a plurality of discrete electrical contact pads, each of said plurality of electrical contact pads beginning at a respective first radius from said axis and ending at a respective second radius from said axis, and each of said plurality of electrical contact pads having a first end at a first respective clocking position, and a second end at a second respective clocking position to create an area in the form of an annulus-segment; at least one of said plurality of discrete electrical contact pads being electrically coupled to said inner surface of said second end cap, and at least another one of said plurality of discrete electrical contact pads being electrically coupled to an inside surface of said first end cap; a third of said plurality of discrete electrical contact pads being formed to have angular displacement between its first and second clocking positions to be less than said respective first and second clocking positions for said electrical contact pads coupled to said inside surfaces of said first and second caps; said battery compartment comprising a corresponding opening in said device to removably receive said battery pack, and comprising a plurality of pogo-pins spring mounted within said compartment, each of said plurality of pogo-pins being arranged therein to engage one of said plurality of electrical contact pads.

* * * * *